(12) United States Patent
Hu et al.

(10) Patent No.: US 11,671,041 B2
(45) Date of Patent: Jun. 6, 2023

(54) TRANSIENT CURRENT PLANNING METHOD FOR ULTRA-HIGH-SPEED PERMANENT MAGNET SYNCHRONOUS MOTOR FOR IMPROVING SPEED REGULATION RESPONSE CAPABILITIES

(71) Applicant: JIANGSU UNIVERSITY, Zhenjiang (CN)

(72) Inventors: Donghai Hu, Zhenjiang (CN); Jing Wang, Zhenjiang (CN); Hongwen He, Zhenjiang (CN); Fengyan Yi, Zhenjiang (CN); Zhongyan Li, Zhenjiang (CN); Jiang Li, Zhenjiang (CN); Zhong Li, Zhenjiang (CN); Jiaming Zhou, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 40 days.

(21) Appl. No.: 17/425,340

(22) PCT Filed: Jan. 12, 2021

(86) PCT No.: PCT/CN2021/071268
§ 371 (c)(1),
(2) Date: Jul. 23, 2021

(87) PCT Pub. No.: WO2022/037003
PCT Pub. Date: Feb. 24, 2022

(65) Prior Publication Data
US 2022/0337182 A1 Oct. 20, 2022

(30) Foreign Application Priority Data
Aug. 21, 2020 (CN) .......................... 202010850957.0

(51) Int. Cl.
*H02P 21/00* (2016.01)
*H02P 21/22* (2016.01)
*H02P 25/022* (2016.01)

(52) U.S. Cl.
CPC .......... *H02P 21/0089* (2013.01); *H02P 21/22* (2016.02); *H02P 25/022* (2013.01); *H02P 2207/05* (2013.01)

(58) Field of Classification Search
CPC .... H02P 21/0089; H02P 21/22; H02P 25/022; H02P 2207/05; H02P 21/0021
(Continued)

(56) References Cited

U.S. PATENT DOCUMENTS 8,796,974 B2 * 8/2014 Wang ..................... H02P 21/32
318/700
9,369,073 B1 * 6/2016 Tian ....................... H02P 6/181

FOREIGN PATENT DOCUMENTS

CN 104539208 A 4/2015
CN 107425769 A 12/2017
(Continued)

OTHER PUBLICATIONS

Zhu Lidong, et al., An IPMSM Deep Flux Weakening Algorithm With Calculable Parameters to Avoid Out-of-control, Proceedings of the CSEE, 2020, pp. 3328-3335, vol. 40 No. 10.

*Primary Examiner* — David Luo
(74) *Attorney, Agent, or Firm* — Bayramoglu Law Offices LLC

(57) ABSTRACT

A transient current planning method for an ultra-high-speed permanent magnet synchronous motor for improving speed regulation response capabilities is provided. A transient current planning module uses a voltage model considering transient current changes to calculate current instruction values of an ultra-high-speed permanent magnet synchronous motor under MTPA control, general flux-weakening
(Continued)

control, and MTPV control; a mode switching condition judgment subsystem judges whether a control mode is MTPA control or general flux-weakening control, or MTPV control, and sends d- and q-axis current instruction values in the corresponding control mode to a voltage decoupling control module; and the voltage decoupling control module calculates d- and q-axis voltage instruction values for controlling the motor, so as to realize control over the ultra-high-speed permanent magnet synchronous motor.

7 Claims, 3 Drawing Sheets

(58) Field of Classification Search
USPC .............................. 318/400.02, 400.01, 700
See application file for complete search history.

(56) References Cited

FOREIGN PATENT DOCUMENTS

| CN | 109274306 A | 1/2019 |
|----|-------------|--------|
| CN | 110289795 A | 9/2019 |
| CN | 112152536 A | 12/2020 |
| JP | 2013212002 A | 10/2013 |

* cited by examiner

TRANSIENT CURRENT PLANNING METHOD FOR ULTRA-HIGH-SPEED PERMANENT MAGNET SYNCHRONOUS MOTOR FOR IMPROVING SPEED REGULATION RESPONSE CAPABILITIES

CROSS REFERENCE TO THE RELATED APPLICATIONS

This application is the national phase entry of International Application No. PCT/CN2021/071268, filed on Jan. 12, 2021, which is based upon and claims priority to Chinese Patent Application No. 202010850957.0, filed on Aug. 21, 2020, the entire contents of which are incorporated herein by reference.

TECHNICAL FIELD

The present invention relates to the field of control over ultra-high-speed permanent magnet synchronous motors, and in particular, to a transient current planning method for an ultra-high-speed permanent magnet synchronous motor for improving speed regulation response capabilities.

BACKGROUND

An ultra-high-speed permanent magnet synchronous motor is applied to scenarios such as ultra-high-speed motorized spindles and high-power fuel cell dedicated air compressors, and is an important core component. Ultra-high-speed permanent magnet synchronous motors can currently meet requirements for the limit rotational speed in ultra-high-speed application scenarios, but speed regulation response capabilities of the ultra-high-speed permanent magnet synchronous motors are still unsatisfactory. Actually, since current trajectories are all derived based on steady-state voltage models in current planning of ultra-high-speed permanent magnet synchronous motors, a current working point derived in the process of motor speed regulation is not a maximum electromagnetic torque output at the rotational speed, thus restricting the speed regulation response of the motors.

Speed regulation response capabilities of ultra-high-speed permanent magnet synchronous motors are improved mostly in active disturbance rejection control in the prior art. Chinese Patent (CN107425769A) has disclosed an active disturbance rejection control method and system for a permanent magnet synchronous motor speed regulation system. A fuzzy adaptive sliding mode speed control method is used to weaken the over-regulation phenomenon in the speed control process and increase the system response speed; feedback compensation of an extended state observer is used to improve the disturbance rejection capabilities of the system, and an internal model current control strategy is used to increase the d- and q-axis current response speed. The patent has the problem of essentially using a disturbance compensation method to improve the disturbance rejection capabilities so as to improve speed regulation response, which cannot increase the maximum torque that can be output by a motor in the process of speed regulation, thus providing limited improvement in speed regulation response capabilities.

Chinese patent (CN110289795A) has disclosed a control system and a control method for a permanent magnet synchronous motor for an electric vehicle. A pre-established disturbance-adaptive active disturbance rejection model is used to process rotor and current signals to obtain a control output signal, and an extended state observer is used to observe a load torque to improve the adjustment precision of a control gain, so as to improve the anti-interference capability of the permanent magnet synchronous motor speed regulation system, thereby enhancing speed regulation response. The patent improves the anti-interference capability by increasing the adjustment precision of the control gain, but still has not improved the output capability of a maximum electromagnetic torque of the motor at a certain rotational speed, and thus there's still a lot of room for improvement in speed regulation response capabilities.

SUMMARY

In view of the deficiencies in the prior art, the present invention provides a transient current planning method for an ultra-high-speed permanent magnet synchronous motor for improving speed regulation response capabilities, which enables the motor to output a maximum electromagnetic torque during operation at any rotational speed and improves speed regulation response capabilities of the motor.

The present invention achieves the aforementioned technical objective by the following technical means.

A transient current planning method for an ultra-high-speed permanent magnet synchronous motor for improving speed regulation response capabilities, wherein a transient current planning system on which the transient current planning method is based includes a transient current planning module, and the transient current planning module includes a MTPA control subsystem, a general flux-weakening control subsystem, a MTPV control subsystem, and a mode switching condition judgment subsystem; the MTPA control subsystem calculates d- and q-axis current instruction values under MTPA control, the general flux-weakening control subsystem calculates d- and q-axis current instruction values in a general flux-weakening control stage, the MTPV control subsystem calculates d- and q-axis current instruction values in a MTPV control stage, the mode switching condition judgment subsystem judges whether a control mode is a MTPA control or general flux-weakening control or MTPV control, and sends the d- and q-axis current instruction values in the corresponding control mode to a voltage decoupling control module, and the voltage decoupling control module calculates d- and q-axis voltage instruction values for controlling the motor;

the transient current planning method includes the following steps:

step (1): judging, by the mode switching condition judgment subsystem, whether to switch to general flux-weakening control or MTPV control, and if yes, entering step (2); otherwise, entering step (5), wherein the switching or not is determined by judging whether d- and q-axis voltage values reach limit values as a switching point, and a judgment formula is:

$$\sqrt{U_d^2 + U_q^2} < U_{max}$$

if the judgment formula is established, switching to MTPA control is performed; otherwise, the method turns to step (2);

step (2): judging, by the mode switching condition judgment subsystem, whether an electrical angular velocity sampling value $\omega_r$ is greater than a MTPV control starting point rotational speed $\omega_{r_s}$, and if not, entering step (3); if yes, entering step (4);

step (3): receiving, by the general flux-weakening control subsystem, d- and q-axis current instruction values $I_d^*$ and $I_q^*$ in a MTPA control stage and the electrical angular velocity sampling value, and calculating d- and q-axis current instruction values in the general flux-weakening control stage, wherein the d-axis current instruction value in the general flux-weakening control stage is:

$$a_1^2 I_d^{*2} + 2a_1 a_2 I_d^* + a_2^2 + b_1^2 (I_{max}^2 - I_d^{*2}) + b_2^2 + 2b_1 b_2 \sqrt{I_{max}^2 - I_d^{*2}} = U_{max}^2$$

in the formula, $a_1$, $a_2$, $b_1$, $b_2$, A, and B are all variables, and $a_1 = \omega_r L_d$, $a_2 = \omega_r \lambda_{PM} + L_q B$, $B = dI_q/dt$, $b_1 = \omega_r L_q$, $b_2 = L_d A$, $A = dI_d/dt$; $I_{max}$ is a maximum stator current, $\lambda_{PM}$ is a permanent magnet flux linkage, $L_d$ is a d-axis inductance, $L_q$ is a q-axis inductance, $I_q$ is aq-axis current instruction initial value, and $I_d$ is a d-axis current instruction initial value;

the q-axis current instruction value in the general flux-weakening control stage is:

$$I_q^* = \sqrt{I_{max}^2 - I_d^{*2}}$$

step (4): receiving, by the MTPV control subsystem, the electrical angular velocity sampling value $\omega_r$ and d- and q-axis current sampling values $i_d$ and $i_q$, and calculating d- and q-axis current instruction values in the MTPV control stage, wherein a calculation formula of the d-axis current instruction value in the MTPV control stage is:

$$\frac{(\rho-1)L_d A - \sqrt{(\rho-1)^2 L_d^2 A^2 + 4(\rho-1)\omega_r L_q C}}{2\omega_r L_q} - \frac{C}{\sqrt{U_{max}^2 - (\omega_r L_d I_d^* + \lambda_{PM}\omega_r + L_q B)^2}} = 0$$

a calculation formula of the q-axis current instruction value in the MTPV control stage is:

$$I_q^* = \frac{C}{(\rho-1)\sqrt{U_{max}^2 - (\omega_r L_d I_d^* + \lambda_{PM}\omega_r + L_q B)^2}}$$

in the formulas, $\rho$ and C are both variables, and $\rho = L_d/L_q$, $C = \rho\omega_r[\lambda_{PM}/L_q + (\rho-1)I_d^*][L_d I_d^* + \lambda_{PM} + BL_q/\omega_r]$; and step (5): receiving, by the voltage decoupling control module, the d- and q-axis current instruction values sent by the transient current planning module and calculating d- and q-axis voltage instructions, so as to realize control over the ultra-high-speed permanent magnet synchronous motor.

As a further technical solution, a process of obtaining the d- and q-axis current instruction values in the MTPA control stage is: judging whether $I_q$ is greater than a maximum q-axis current wherein if yes, a calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + \frac{I_{max}^2}{2}} \\ I_q^* = \text{sign}(n^*)\sqrt{I_{max}^2 - I_{dmax1}^2} \end{cases} ;$$

if not, a calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + I_q^2} \\ I_q^* = I_q \end{cases} ,$$

wherein sign(n*) is a sign function.

As a further technical solution, a calculation formula of the maximum current $I_{qmax1}$ is:

$$\begin{cases} I_{dmax1} = \frac{\lambda_{PM}}{4(L_q - L_d)} - \sqrt{\frac{\lambda_{PM}^2}{16(L_q - L_d)^2} + \frac{I_{max}^2}{2}} \\ I_{qmax1} = \sqrt{I_{max}^2 - I_{dmax1}^2} \end{cases} ,$$

wherein $I_{d\,max1}$ is a maximum d-axis current under MTPA control.

As a further technical solution, the q-axis current instruction initial value is obtained from $$T_e = \frac{1}{2}n_p\left[\lambda_{PM} + \sqrt{\lambda_{PM}^2 + 4I_q^2(L_d - L_q)^2}\right]I_q$$

and $$T_e = \frac{\omega_{ref} - \omega_r}{\Delta t}J,$$

wherein $T_e$ is an electromagnetic torque, $\omega_{ref}$ is a target rotational speed, $\Delta t$ is a sampling interval, J is a shaft moment of inertia, and $n_p$ is a number of pole-pairs.

As a further technical solution, the MTPV control starting point rotational speed is calculated by combining the d and q current instruction values in the MTPV control stage and a current limit circle equation, which is specifically:

$$\begin{cases} \frac{(\rho-1)L_d A - \sqrt{(\rho-1)^2 L_d^2 A^2 + 4(\rho-1)\omega_{Vs} L_q C}}{2\omega_{Vs} L_q} - \\ \frac{C}{\sqrt{U_{max}^2 - (\omega_{Vs} L_d I_d^* + \lambda_{PM}\omega_{Vs} + L_q B)^2}} = 0 \\ I_q^* = \frac{C}{(\rho-1)\sqrt{U_{max}^2 - (\omega_{Vs} L_d I_d^* + \lambda_{PM}\omega_{Vs} + L_q B)^2}} \\ I_d^{*2} + I_q^{*2} = I_{max}^2 \end{cases} .$$

As a further technical solution, values of A and B in the general flux-weakening control stage A, B are:

$$\begin{cases} A = \frac{I_{d1} - I_{dr}}{\Delta t} \\ B = \frac{I_{q1} - I_{qr}}{\Delta t} \end{cases}$$

wherein $I_{dr}$ and $I_{qr}$ are respectively d- and q-axis current sampling values; $I_{d1}$ and $I_{q1}$ are respectively the d- and q-axis current instruction values in the general flux-weakening control stage, which are specifically:

$$\begin{cases} I_{d1} = \dfrac{L_d \lambda_{PM} - L_q \sqrt{\lambda_{PM}^2 + (L_q^2 - L_d^2)\left(I_{max}^2 - \dfrac{U_{max}^2}{\omega_r^2 L_q^2}\right)}}{L_q^2 - L_d^2} \\ I_{q1} = \sqrt{I_{max}^2 - I_{d1}^2} \end{cases}.$$

As a further technical solution, values of A and B in the MTPV control stage are:

$$\begin{cases} A = \dfrac{I_{d2} - I_{dr}}{\Delta t} \\ B = \dfrac{I_{q2} - I_{qr}}{\Delta t} \end{cases}$$

wherein $I_{d2}$ and $I_{q2}$ are respectively the d- and q-axis current instruction values in the MTPV control stage, which are specifically:

$$\begin{cases} I_{d2} = -\dfrac{\lambda_{PM}}{L_d} + E \\ I_{q2} = \dfrac{\sqrt{(U_{max}/\omega_r)^2 - (L_d E)^2}}{L_q} \\ E = \dfrac{\rho \lambda_{PM} - \sqrt{(\rho \lambda_{PM})^2 + 8(\rho - 1)^2 (U_{max}/\omega_r)^2}}{4(\rho - 1)L_d} \end{cases}$$

wherein in the formula, E is a variable.

The beneficial effects of the present invention are: in the present invention, a transient current planning module is established and uses a voltage model considering transient current changes to calculate current instruction values of an ultra-high-speed permanent magnet synchronous motor in a general flux-weakening control stage and a MTPV control stage to obtain a current trajectory; meanwhile, a mode switching condition judgment subsystem judges whether the ultra-high-speed permanent magnet synchronous motor should use MTPA control or general flux-weakening control or MTPV control, and outputs d- and q-axis current instructions in the control stage to a voltage decoupling control module; and the voltage decoupling control module calculates d- and q-axis voltage instruction values so as to realize control over the ultra-high-speed permanent magnet synchronous motor. The present invention can effectively improve dynamic characteristics of the ultra-high-speed permanent magnet synchronous motor in the speed regulation process, achieve more precise torque output capability of the motor, and enable the motor to output the maximum electromagnetic torque that can be exerted by the motor during operation at any rotational speed, and enhance speed regulation response capabilities.

DETAILED DESCRIPTION OF THE EMBODIMENTS

The present invention is further illustrated below with reference to the accompanying drawings and specific embodiments, but the protection scope of the present invention is not limited thereto.

Figure 1:
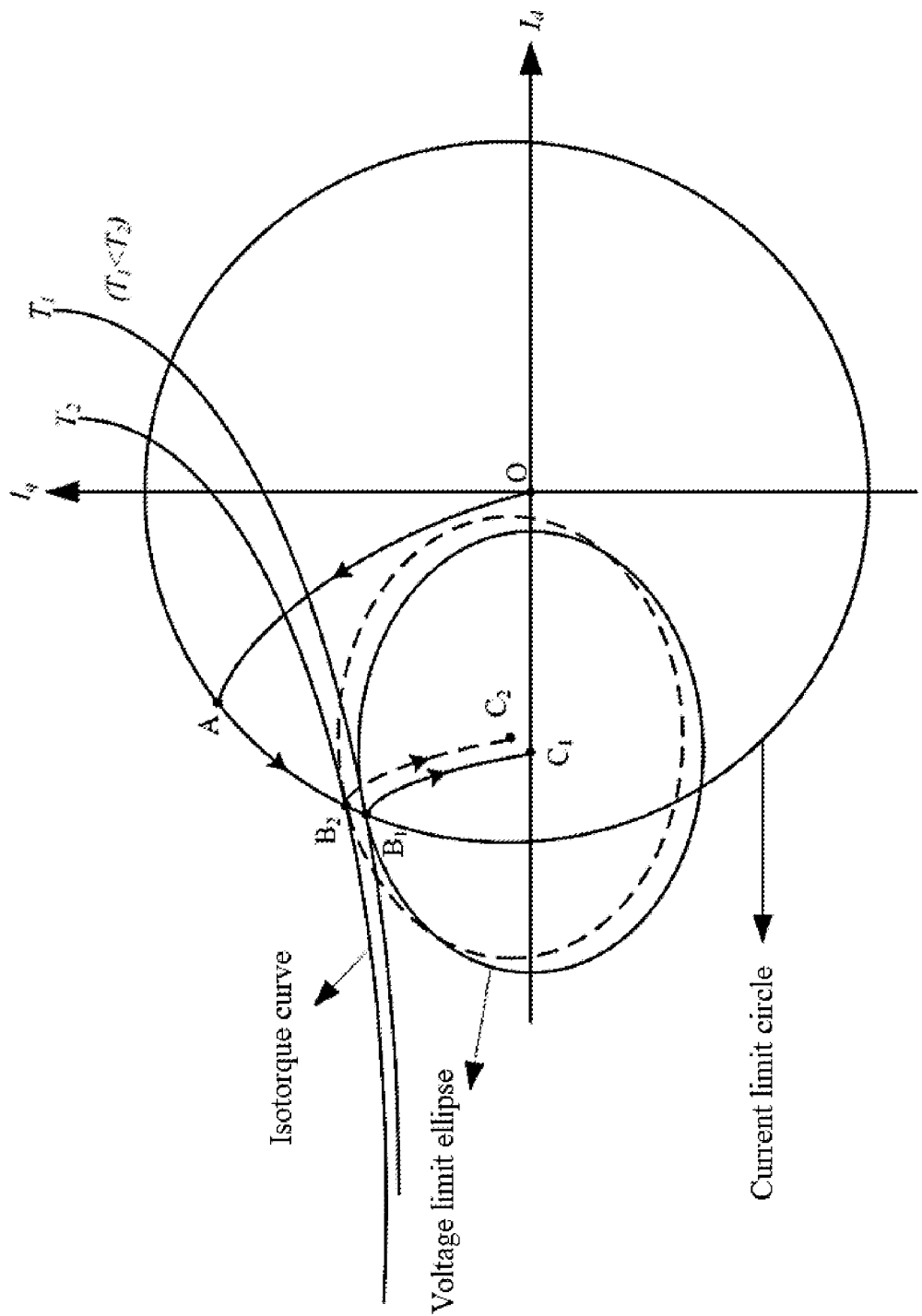
FIG. 1 is an architecture diagram illustrating control over an ultra-high-speed permanent magnet synchronous motor in the present invention.

FIG. 1 shows a transient current planning system for an ultra-high-speed permanent magnet synchronous motor for improving speed regulation response capabilities. A transient current planning module is established. The module receives a target rotational speed $\omega_{ref}$, an electrical angular velocity sampling value U) and d- and q-axis current sampling values $i_d$, $i_q$, and uses a voltage model considering transient current changes to calculate current instruction values of the ultra-high-speed permanent magnet synchronous motor under MTPA control, general flux-weakening control, and MTPV control to obtain a current trajectory; meanwhile, the transient current planning module uses given switching rules to judge a control mode (MTPA control or general flux-weakening control or MTPV control) that should be adopted by the ultra-high-speed permanent magnet synchronous motor, and outputs and q-axis current instructions $I_d^*$, $I_q^*$ in the control mode to a voltage decoupling control module; and the voltage decoupling control module calculates and q-axis voltage instruction values $U_d^*$ and $U_q^*$, so as to realize control over the ultra-high-speed permanent magnet synchronous motor.

The transient current planning module includes a MTPA control subsystem, a general flux-weakening control subsystem, a MTPV control subsystem, and a mode switching condition judgment subsystem.

Figure 2:
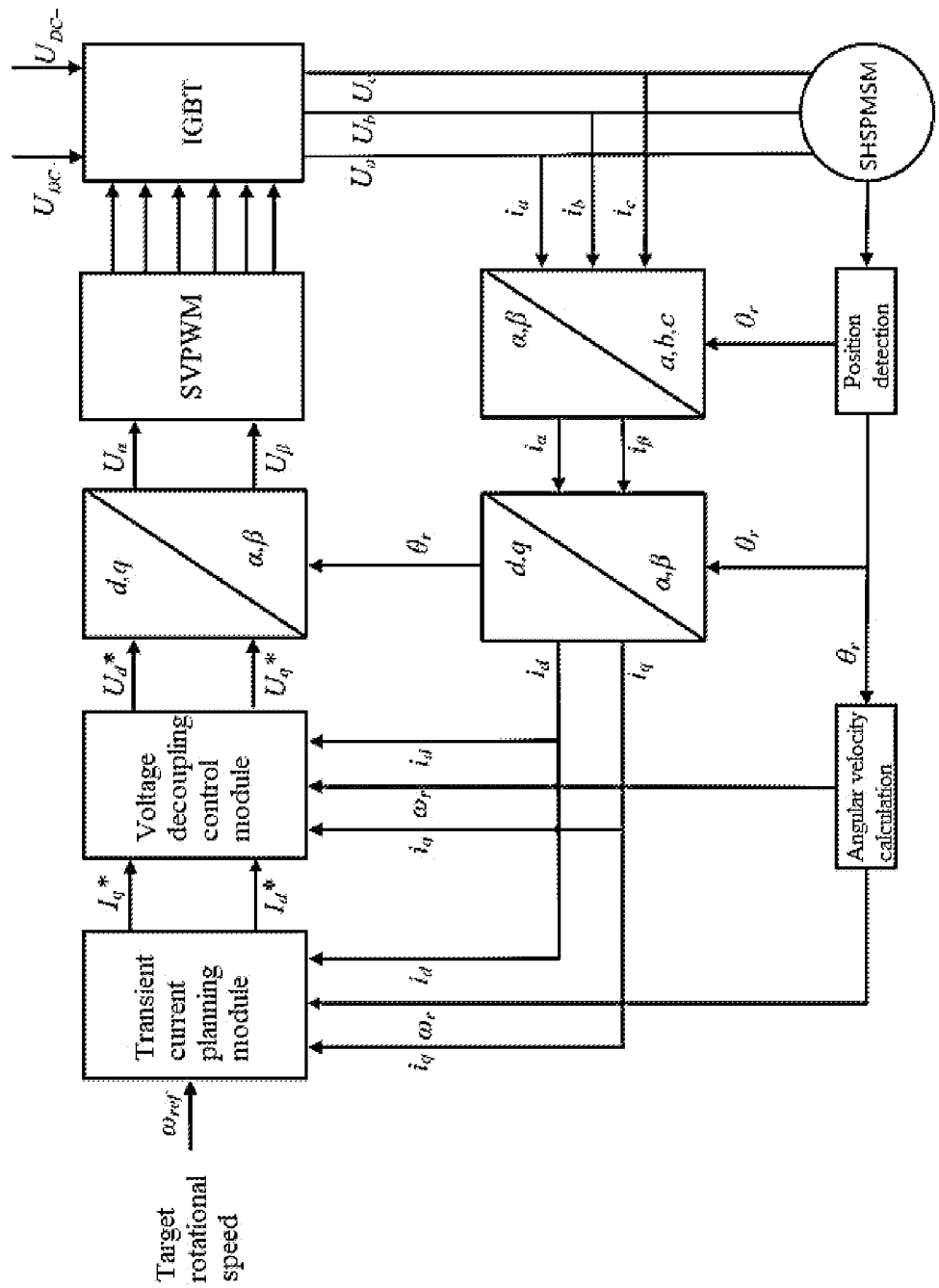
FIG. 2 is a flowchart illustrating transient current trajectory planning for the ultra-high-speed permanent magnet synchronous motor in the present invention.

As shown in FIG. 2, a transient current planning method for an ultra-high-speed permanent magnet synchronous motor for improving speed regulation response capabilities specifically includes the following steps:

Step (1): a rotational speed command is input.

Step (2): a transient current planning module receives a target rotational speed $\omega_{ref}$, an electrical angular velocity sampling value $\omega_r$ and d- and q-axis current sampling values $i_d$ and $i_q$.

Step (3): a q-axis current instruction initial value $I_q$ is obtained by a rotational speed regulator and a PI regulator, and $I_q$ is input to a MTPA control subsystem.

The q-axis current instruction initial value $I_q$ is obtained through the following method:

1) a required electromagnetic torque is calculated by the rotational speed regulator and the PI regulator, where a calculation formula is:

$$T_e = \dfrac{\omega_{ref} - \omega_r}{\Delta t} J \tag{1}$$

where in the formula, $\Delta t$ is a sampling interval, and J is a shaft moment of inertia.

2) A relation between the torque and the q-axis current initial value $I_q$ is calculated according to an electromagnetic torque equation and a current limit equation:

$$T_e = \tfrac{1}{2} n_p [\lambda_{PM} + \sqrt{\lambda_{PM}^2 + 4 I_q^2 (L_d - L_q)^2}] I_q \tag{2}$$

where in the formula, $n_p$ is a number of pole-pairs, $\lambda_{PM}$ is a permanent magnet flux linkage, $L_d$ is a d-axis inductance, and $L_q$ is a q-axis inductance.

The current instruction initial value $I_q$ is obtained from formulas (1) and (2).

Step (4): the MTPA control subsystem calculates and q-axis current instruction values in a MTPA control stage.

1) A maximum q-axis current $i_{qmax1}$ under MTPA control is calculated, where a calculation formula is:

$$\begin{cases} I_{dmax1} = \frac{\lambda_{PM}}{4(L_q - L_d)} - \sqrt{\frac{\lambda_{PM}^2}{16(L_q - L_d)^2} + \frac{I_{max}^2}{2}} \\ I_{qmax1} = \sqrt{I_{max}^2 - I_{dmax1}^2} \end{cases} \quad (3)$$

wherein the formula, $I_{d\ max1}$ is a maximum d-axis current under MTPA control, and $I_{max}$ is a maximum stator current.

2) It is judged whether $I_q$ is greater than $I_{qmax1}$, and if yes, a calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + \frac{I_{max}^2}{2}} \\ I_q^* = \text{sign}(n^*)\sqrt{I_{max}^2 - I_{dmax1}^2} \end{cases} \quad (4)$$

if not, a calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + I_q^2} \\ I_q^* = I_q \end{cases} \quad (5)$$

where in the formula, $\text{sign}(n^*)$ is a sign function.

Step (5): a mode switching condition judgment subsystem judges whether to switch to general flux-weakening control or MTPV control, and if yes, the method enters step (6); otherwise, the method enters step (9).

The judging whether to switch to general flux-weakening control or MTPV control is achieved by judging whether d- and q-axis voltage values reach limit values as a switching point, and a judgment formula is:

$$\sqrt{U_d^2 + U_q^2} < U_{max} \quad (6)$$

where in the formula, $U_{max}$ is a terminal voltage limit value.

If formula (6) is established, switching to MTPA control is performed; if the condition is not established, the method turns to step (6) to further judge the control mode.

Step (6): the mode switching condition judgment subsystem judges whether the electrical angular velocity sampling value is greater than a MTPV control starting point rotational speed, namely, $\omega_r \geq \omega_y$, and if not, the method enters (7); if yes, the method enters step (8).

Step (7): a general flux-weakening control subsystem receives the d- and q-axis current instruction values calculated in step (4) and the electrical angular velocity sampling value, and calculates d- and q-axis current instruction values in the general flux-weakening control stage, and the method enters step (9).

The derivation process of the d- and q-axis current instruction values under general flux-weakening control considers transient current changes to improve precise response of a torque in the general flux-weakening control stage, enlarge the torque output range of the motor, and achieve the purpose of enhancing speed regulation response capabilities.

A voltage model considering transient current changes is:

$$\begin{cases} U_d = RI_d + L_d \frac{dI_d}{dt} - \omega_r L_q I_q \\ U_q = RI_q + L_q \frac{dI_q}{dt} + \omega_r (L_d I_d + \lambda_{PM}) \end{cases} \quad (7)$$

wherein the formula, R is a stator resistance, and $I_d$ is a d-axis current instruction initial value.

In current applications, in order to derive a current trajectory instruction more conveniently, transient current voltage drop terms $$L_d \frac{dI_d}{dt} \text{ and } L_q \frac{dI_q}{dt}$$

in formula (7) are usually omitted, while the control system provided in the present invention considers transient current voltage drop terms.

After transient current changes are considered, a calculation formula of the d-axis current instruction value in the general flux-weakening control stage is:

$$\frac{a_1^2 I_d^{*2} + 2a_1 a_2 I_d^* + a_2^2 + b_1^2(I_{max}^2 - I_d^{*2}) + b_2^2 + 2b_1 b_2}{\sqrt{I_{max}^2 - I_d^{*2}}} = U_{max}^2 \quad (8)$$

wherein the formula, $a_1$, $a_2$, $b_1$, $b_2$, A, and B are all variables, and $a_1 = \omega_r L_d$, $a_2 = \omega_r \lambda_{PM} + L_q B$, $B = dI_q/dt$, $b_1 = \omega_r L_q$, $b_2 = L_d A$, $A = dI_d/dt$.

A calculation formula of the q-axis current instruction value in the general flux-weakening control stage is:

$$I_q^* = \sqrt{I_{max}^2 - I_d^{*2}} \quad (9)$$

When a Simulink control model is built, formulas (8) and (9) are written as an m-file to facilitate calculation of d- and q-axis current instruction values in the case of any electrical angular velocity sampling value in the general flux-weakening control stage.

Step (8): the MTPV control subsystem receives the electrical angular velocity sampling value $\omega_r$ and the d- and q-axis current sampling values $i_d$, $i_q$, and calculates d- and q-axis current instruction values in the MTPV control stage.

The derivation process of the d- and q-axis current instruction values in the MTPV control stage considers transient current changes to improve precise response of a torque in the MTPV control stage, enlarge the torque output range of the motor, and achieve the purpose of enhancing speed regulation response capabilities. After transient current changes are considered, a calculation formula of the d-axis current instruction value in the MTPV control stage is:

$$\frac{(\rho - 1)L_d A - \sqrt{(\rho - 1)^2 L_d^2 A^2 + 4(\rho - 1)\omega_r L_q C}}{2\omega_r L_q} - \quad (10)$$

$$\frac{C}{\sqrt{U_{max}^2 - (\omega_r L_d I_d^* + \lambda_{PM} \omega_r + L_q B)^2}} = 0$$

a calculation formula of the q-axis current instruction value in the MTPV control stage is:

$$I_q^* = \frac{C}{(\rho - 1)\sqrt{U_{max}^2 - (\omega_r L_d I_d^* + \lambda_{PM} \omega_r + L_q B)^2}} \quad (11)$$

where in the formulas, ρ and C are both variables, and
$\rho = L_d/L_q$, $C = \rho\omega_r[\lambda_{PM}/L_q + (\rho-1)I_d^*][L_d I_d^* + \lambda_{PM} + BL_q/\omega_r]$.

When a Simulink control model is built, formulas (10) and (11) are written as an m-file to facilitate calculation of d- and q-axis current instruction values in the case of any electrical angular velocity sampling value in the MTPV control stage.

In addition, the MTPV control starting point rotational speed is calculated by combining the d and q current instruction values in the MTPV control stage and a current limit circle equation; a calculation formula is:

$$\begin{cases} \dfrac{(\rho-1)L_d A - \sqrt{(\rho-1)^2 L_d^2 A^2 + 4(\rho-1)\omega_{Vs} L_q C}}{2\omega_{Vs} L_q} - \\ \dfrac{C}{\sqrt{U_{max}^2 - (\omega_{Vs} L_d I_d^* + \lambda_{PM}\omega_{Vs} + L_q B)^2}} = 0 \\ I_q^* = \dfrac{C}{(\rho-1)\sqrt{U_{max}^2 - (\omega_{Vs} L_d I_d^* + \lambda_{PM}\omega_{Vs} + L_q B)^2}} \\ I_d^{*2} + I_q^{*2} = I_{max}^2 \end{cases} \quad (12)$$

In the above process, a transient current change value needs to be calculated while considering transient current changes, and a calculation method is as follows:

For the general flux-weakening control stage, while not considering transient current changes, a voltage limit elliptic equation and a current limit circle equation may be combined to obtain d- and q-axis current instruction values as follows:

$$\begin{cases} I_{d1} = \dfrac{L_d \lambda_{PM} - L_q \sqrt{\lambda_{PM}^2 + (L_q^2 - L_d^2)\left(I_{max}^2 - \dfrac{U_{max}^2}{\omega_r^2 L_q^2}\right)}}{L_q^2 - L_d^2} \\ I_{q1} = \sqrt{I_{max}^2 - I_{d1}^2} \end{cases} \quad (13)$$

Differences between $I_{d1}$ and $I_{q1}$ and d- and q-axis current sampling values $I_{dr}$, $I_{qr}$ are respectively calculated, and a PID regulator may be used to calculate values of A and B in the general flux-weakening control stage, where a calculation formula is:

$$\begin{cases} A = \dfrac{I_{d1} - I_{dr}}{\Delta t} \\ B = \dfrac{I_{q1} - I_{qr}}{\Delta t} \end{cases} \quad (14)$$

For the MTPV control stage, while not considering transient current changes, a voltage limit elliptic equation and an electromagnetic torque equation may be combined to obtain d- and q-axis current instruction values as follows:

$$\begin{cases} I_{d2} = -\dfrac{\lambda_{PM}}{L_d} + E \\ I_{q2} = \dfrac{\sqrt{(U_{max}/\omega_r)^2 - (L_d E)^2}}{L_q} \\ E = \dfrac{\rho\lambda_{PM} - \sqrt{(\rho\lambda_{PM})^2 + 8(\rho-1)^2 (U_{max}/\omega_r)^2}}{4(\rho-1)L_d} \end{cases} \quad (15)$$

where E is a variable.

Differences between $I_{d2}$ and $I_{q2}$ and d- and q-axis current sampling values $I_{dr}$, $I_{qr}$ are respectively calculated, and the PID regulator may be used to calculate values of A and B in the MTPV control stage, where a calculation formula is:

$$\begin{cases} A = \dfrac{I_{d2} - I_{dr}}{\Delta t} \\ B = \dfrac{I_{q2} - I_{qr}}{\Delta t} \end{cases} \quad (16)$$

Step (9): the voltage decoupling control module receives the d- and q-axis current instruction values $I_d^*$, $I_q^*$ sent from the transient current planning module, and calculates d- and q-axis voltage instructions $U_d^*$, $U_q^*$ Step (10): a coordinate transform module converts the d- and q-axis voltage instructions $U_d^*$, $U_q^*$ into $U_\alpha$ and $U_\beta$, and a SVPWM module outputs a six-pulse IGBT control signal; meanwhile, an angular velocity calculation module and a position detection module detect a rotor position and an electrical angular velocity sampling value in real time for use in the calculation of the above steps to complete motor control.

Figure 3:
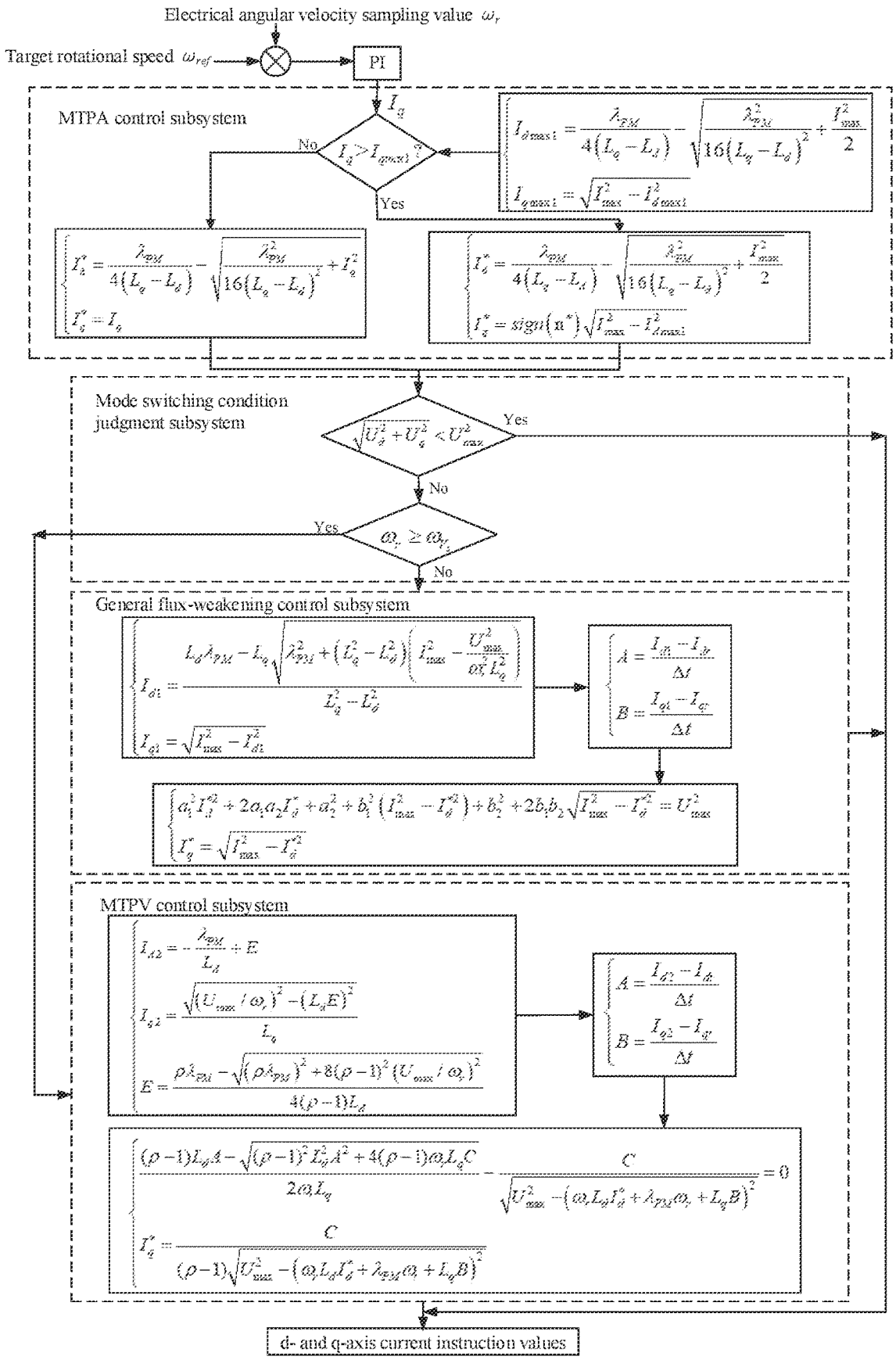
FIG. 3 is a diagram illustrating a changing trend of a current trajectory before and after transient current changes are considered.

As shown in FIG. 3, the current trajectory used in the current ultra-high-speed permanent magnet synchronous motor is obtained from steady-state voltage and current models, and the trajectory is OA→AB$_1$→B$_1$C$_1$, where the section OA is a MTPA (maximum torque per ampere) control stage, the section AB$_1$ is a general flux-weakening control stage, and the section B$_1$C$_1$ is a MTPV (maximum torque per volt) control stage. Since the derivation of the trajectory does not consider the influence of transient current, higher torque output capability cannot be achieved. After the influence of transient current is considered, a voltage limit ellipse will move to the upper right (the moved voltage limit ellipse is denoted by dashed lines). At this time, the section AB$_1$ turns into shorter AB$_2$, and the section B$_1$C$_1$ will also move to the upper right to become B$_2$C$_2$. At this time, the torque of the section B$_2$C$_2$ will be larger than that of the section B$_1$C$_1$, thereby achieving a larger torque output range in the MTPV control stage.

The described embodiment is a preferred embodiment of the present invention, but the present invention is not limited to the aforementioned embodiment. Any obvious improvements, substitutions or modifications that can be made by those skilled in the art without departing from the essential content of the present invention shall fall within the protection scope of the present invention.

What is claimed is:

1. A transient current planning method for an ultra-high-speed permanent magnet synchronous motor for improving speed regulation response capabilities, wherein
   the transient current planning method is based on a transient current planning system comprising a transient current planning module, and
   the transient current planning module comprises a MTPA control subsystem, a general flux-weakening control subsystem, a MTPV control subsystem, and a mode switching condition judgment subsystem;
   the MTPA control subsystem calculates d- and q-axis current instruction values under a MTPA control,
   the general flux-weakening control subsystem calculates d- and q-axis current instruction values in a general flux-weakening control stage,
   the MTPV control subsystem calculates d- and q-axis current instruction values in a MTPV control stage, the mode switching condition judgment subsystem judges whether a control mode is the MTPA control or a general flux-weakening control or an MTPV control, and sends the d- and q-axis current instruction values in a corresponding control mode to a voltage decoupling control module, and the voltage decoupling control module calculates d- and q-axis voltage instruction values for controlling the ultra-high-speed permanent magnet synchronous motor;

the transient current planning method comprises the following steps:

step (1): judging, by the mode switching condition judgment subsystem, whether to switch to the general flux-weakening control or the MTPV control, and if yes, entering step (2); otherwise, entering step (5), wherein switching or not is determined by judging whether d- and q-axis voltage values reach limit values as a switching point, and a judgment formula is:

$$\sqrt{U_d^2 + U_q^2} < U_{max}$$

if the judgment formula is established, switching to the MTPA control is performed; otherwise, the transient current planning method turns to step (2);

step (2): judging, by the mode switching condition judgment subsystem, whether a rotational speed sampling value $\omega_r$ is greater than a MTPV control starting point rotational speed $\omega_{Vs}$, and if not, entering step (3); if yes, entering step (4);

step (3): receiving, by the general flux-weakening control subsystem, d- and q-axis current instruction values $I_d^*$ and $I_q^*$ in a MTPA control stage and the rotational speed sampling value, and calculating the d- and q-axis current instruction values in the general flux-weakening control stage, wherein a d-axis current instruction value in the general flux-weakening control stage is:

$$\sqrt{\frac{a_1^2 I_d^{*2} + 2a_1 a_2 I_d^* + a_2^2 + b_1^2 (I_{max}^2 - I_d^{*2}) + b_2^2 + 2b_1 b_2}{I_{max}^2 - I_d^{*2}}} = U_{max}$$

wherein, $a_1$, $a_2$, $b_1$, $b_2$, A, and B are all variables, and $a_1 = \omega_r L_d$, $a_2 = \omega_r \lambda_{PM} + L_q B$, $B = dI_q/dt$, $b_1 = \omega_r L_q$, $b_2 = L_d A$, $A = dI_d/dt$; $I_{max}$ is a maximum stator current, $\lambda_{PM}$ is a permanent magnet flux linkage, $L_d$ is a d-axis inductance, $L_q$ is a q-axis inductance, $I_q$ is a q-axis current instruction initial value, and $I_d$ is a d-axis current instruction initial value;

a q-axis current instruction value in the general flux-weakening control stage is:

$$I_q^* = \sqrt{I_{max}^2 - I_d^{*2}}$$

step (4): receiving, by the MTPV control subsystem, the rotational speed sampling value $\omega_r$ and d- and q-axis current sampling values $i_d$ and $i_q$, and calculating the d- and q-axis current instruction values in the MTPV control stage, wherein a calculation formula of a d-axis current instruction value in the MTPV control stage is:

$$\frac{(\rho - 1) L_d A - \sqrt{(\rho - 1)^2 L_d^2 A^2 + 4(\rho - 1)\omega_r L_q C}}{2\omega_r L_q} -$$

$$\frac{C}{\sqrt{U_{max}^2 - (\omega_r L_d I_d^* + \lambda_{PM} \omega_r + L_q B)^2}} = 0$$

a calculation formula of a q-axis current instruction value in the MTPV control stage is:

$$I_q^* = \frac{C}{(\rho - 1)\sqrt{U_{max}^2 - (\omega_r L_d I_d^2 + \lambda_{PM}\omega_r + L_q B)^2}}$$

wherein, $\rho$ and C are both variables, and $\rho = L_d/L_q$, $C = \rho\omega_r[\lambda_{PM}/L_q + (\rho - 1)I_d^*][L_d I_d^* + \lambda_{PM} + BL_q/\omega_r]$; and step (5): receiving, by the voltage decoupling control module, the d- and q-axis current instruction values sent by the transient current planning module and calculating d- and q-axis voltage instructions, so as to implement a control over the ultra-high-speed permanent magnet synchronous motor.

2. The transient current planning method of the transient current planning system for the ultra-high-speed permanent magnet synchronous motor according to claim 1, wherein a process of obtaining the d- and q-axis current instruction values in the MTPA control stage is:

judging whether $I_q$ is greater than a maximum q-axis current $I_{qmax1}$, wherein if yes, a first calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + \frac{I_{max}^2}{2}} \\ I_q^* = \text{sign}(n^*)\sqrt{I_{max}^2 - I_{dmax1}^2} \end{cases} ;$$

if not, a second calculation formula of the d- and q-axis current instruction values is:

$$\begin{cases} I_d^* = \frac{\lambda_{PM}}{4(L_q - L_d)} - \sqrt{\frac{\lambda_{PM}^2}{16(L_q - L_d)^2} + I_q^2} \\ I_q^* = I_q \end{cases} ,$$

wherein sign(n*) is a sign function.

3. The transient current planning method of the transient current planning system for the ultra-high-speed permanent magnet synchronous motor according to claim 2, wherein a calculation formula of the maximum q-axis current $I_{qmax1}$ is:

$$\begin{cases} I_{dmax1} = \frac{\lambda_{PM}}{4(L_q - L_d)} - \sqrt{\frac{\lambda_{PM}^2}{16(L_q - L_d)^2} + \frac{I_{max}^2}{2}} \\ I_{qmax1} = \sqrt{I_{max}^2 - I_{dmax1}^2} \end{cases} ,$$

wherein $I_{dmax1}$ is a maximum d-axis current under the MTPA control.

4. The transient current planning method of the transient current planning system for the ultra-high-speed permanent magnet synchronous motor according to claim 1, wherein the q-axis current instruction initial value is obtained from $$T_e = \frac{\omega_{ref} - \omega_r}{\Delta t} J \text{ and } T_e = \frac{1}{2} n_p \left[\lambda_{PM} + \sqrt{\lambda_{PM}^2 + 4I_q^2(L_d - L_q)^2}\right] I_q ,$$

wherein $T_e$ is an electromagnetic torque, $\omega_{ref}$ is a target rotational speed, $\Delta t$ is a sampling interval, J is a shaft moment of inertia, and $n_p$ is a number of pole-pairs.

5. The transient current planning method of the transient current planning system for the ultra-high-speed permanent magnet synchronous motor according to claim 1, wherein the MTPV control starting point rotational speed is calculated by combining the d- and q-axis current instruction values in the MTPV control stage and a current limit circle equation, specifically as follows:

$$\begin{cases} \dfrac{(\rho-1)L_d A - \sqrt{(\rho-1)^2 L_d^2 A^2 + 4(\rho-1)\omega_{Vs} L_q C}}{\omega_{Vs} L_q} - \\ \dfrac{C}{\sqrt{U_{max}^2 - (\omega_{Vs} L_d I_d^* + \lambda_{PM}\omega_{Vs} + L_q B)^2}} = 0 \\ I_q^* = \dfrac{C}{(\rho-1)\sqrt{U_{max}^2 - (\omega_{Vs} L_d I_d^* + \lambda_{PM}\omega_{Vs} + L_q B)^2}} \\ I_d^{*2} + I_q^{*2} = I_{max}^2 \end{cases}.$$

6. The transient current planning method of the transient current planning system for the ultra-high-speed permanent magnet synchronous motor according to claim 1, wherein values of A and B in the general flux-weakening control stage are:

$$\begin{cases} A = \dfrac{I_{d1} - I_{dr}}{\Delta t} \\ B = \dfrac{I_{q1} - I_{qr}}{\Delta t} \end{cases}$$

wherein $I_{dr}$ and $I_{qr}$ are respectively d- and q-axis current sampling values; $I_{d1}$ and $I_{q1}$ are respectively the d- and q-axis current instruction values in the general flux-weakening control stage, specifically as follows:

$$\begin{cases} I_{d1} = \dfrac{L_d \lambda_{PM} - L_q \sqrt{\lambda_{PM}^2 + (L_q^2 - L_d^2)\left(I_{max}^2 - \dfrac{U_{max}^2}{\omega_r^2 L_q^2}\right)}}{L_q^2 - L_d^2} \\ I_{q1} = \sqrt{I_{max}^2 - I_{d1}^2} \end{cases}.$$

7. The transient current planning method of the transient current planning system for the ultra-high-speed permanent magnet synchronous motor according to claim 1, wherein values of A and B in the MTPV control stage are:

$$\begin{cases} A = \dfrac{I_{d2} - I_{dr}}{\Delta t} \\ B = \dfrac{I_{q2} - I_{qr}}{\Delta t} \end{cases}$$

wherein $I_{d2}$ and $I_{q2}$ are respectively the d- and q-axis current instruction values in the MTPV control stage, specifically as follows:

$$\begin{cases} I_{d2} = -\dfrac{\lambda_{PM}}{L_d} + E \\ I_{q2} = \dfrac{\sqrt{(U_{max}/\omega_r)^2 - (L_d E)^2}}{L_q} \\ E = \dfrac{\rho \lambda_{PM} - \sqrt{(\rho \lambda_{PM})^2 + 8(\rho-1)^2 (U_{max}/\omega_r)^2}}{4(\rho-1)L_d} \end{cases}$$

wherein, E is a variable.

* * * * *